United States Patent
Lee

(10) Patent No.: US 9,838,960 B2
(45) Date of Patent: Dec. 5, 2017

(54) METHOD OF HANDLING CELL SELECTION AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 101 days.

(21) Appl. No.: 14/140,483

(22) Filed: Dec. 25, 2013

(65) Prior Publication Data

US 2014/0185548 A1 Jul. 3, 2014

Related U.S. Application Data

(60) Provisional application No. 61/746,570, filed on Dec. 28, 2012.

(51) Int. Cl.
*H04W 48/20* (2009.01)
*H04W 4/00* (2009.01)
*H04W 48/16* (2009.01)

(52) U.S. Cl.
CPC .......... *H04W 48/20* (2013.01); *H04W 4/005* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2004/0082328 A1* | 4/2004 | Japenga | H04W 36/30 455/436 |
| 2005/0170782 A1 | 8/2005 | Rong | |
| 2005/0250529 A1* | 11/2005 | Funnell | H04W 36/24 455/525 |
| 2009/0067386 A1* | 3/2009 | Kitazoe | H04J 11/0069 370/332 |
| 2009/0116570 A1 | 5/2009 | Bala | |
| 2010/0120395 A1* | 5/2010 | Chiba | H04W 4/22 455/404.2 |
| 2012/0008574 A1 | 1/2012 | Xiao | |
| 2012/0076028 A1 | 3/2012 | Ko | |
| 2013/0223235 A1* | 8/2013 | Hu et al. | 370/242 |

(Continued)

FOREIGN PATENT DOCUMENTS

| | | |
|---|---|---|
| CN | 1914827 A | 2/2007 |
| CN | 1941682 A | 4/2007 |

(Continued)

OTHER PUBLICATIONS

CATT, Analysis of coverage improvement for low-cost MTC LTE UEs, 3GPP TSG RAN WG1 Meeting #71, R1-125247, Nov. 12-16, 2012, XP050663126, New Orleans, USA.

(Continued)

*Primary Examiner* — Kevin C Harper
*Assistant Examiner* — Derrick V Rose
(74) *Attorney, Agent, or Firm* — Winston Hsu

(57) ABSTRACT

A method of handling a cell selection for a communication device comprises performing the cell selection in a first one of a normal mode and a coverage enhancement mode, to select a cell; and camping on the cell in a second one of the normal mode and the coverage enhancement mode.

30 Claims, 6 Drawing Sheets

(56) References Cited

U.S. PATENT DOCUMENTS

2013/0301434 A1 11/2013 Krishnamurthy
2015/0092566 A1* 4/2015 Balachandran et al. ...... 370/242

FOREIGN PATENT DOCUMENTS

| CN | 101640579 A | 2/2010 |
|---|---|---|
| EP | 1 770 889 A2 | 4/2007 |
| EP | 1 770 889 A3 | 10/2008 |
| EP | 2 012 455 A2 | 1/2009 |
| EP | 2 012 455 A3 | 10/2012 |
| WO | 2011123755 A1 | 10/2011 |
| WO | 2012008957 A1 | 1/2012 |
| WO | 2013119158 A1 | 8/2013 |

OTHER PUBLICATIONS

3GPP, 3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.1.0 (Sep. 2012), Sep. 19, 2012, pp. 1-33, XP050649483, 3GPP Organizational Partners, Valbonne, France.

Ericsson et al., Required functionality for coverage enhancements for MTC, 3GPP TSG-RAN WG1 Meeting #71, R1-124888, Nov. 12-16, 2012, XP050663058, New Orleans, USA.

Huawei et al., Cell selection and reselection in coverage enhancement, 3GPP TSG RAN WG2 Meeting #85, R2-140327, Feb. 10-14, 2014, pp. 1-3, XP050737545, Prague, Czech Republic.

CATT, Discussion on mobility support for Low Complexity MTC UEs and MTC coverage enhancement, 3GPP TSG RAN WG2 Meeting #84, R2-134040, Nov. 11-15, 2013, XP050736847, San Francisco, USA.

MediaTek Inc., Coverage Enhancement Analysis and Techniques for MTC Devices, 3GPP TSG-RAN WG1 #71, R1-124942, New Orleans, Louisiana, USA, Nov. 12-16, 2012.

LG Electronics, Discussion on Coverage Enhancement for a low-cost MTC UE, 3GPP TSG RAN WG1 #71, R1-124993, New Orleans, USA, Nov. 12-16, 2012.

Alcatel-Lucent et al., "Potential solutions for improved coverage for MTC UEs", 3GPP TSG-RAN WG1 Meeting #71, R1-124883, New Orleans, USA, Nov. 12-16, 2012, p. 1.

* cited by examiner

METHOD OF HANDLING CELL SELECTION AND RELATED COMMUNICATION DEVICE

CROSS REFERENCE TO RELATED APPLICATIONS

This application claims the benefit of U.S. Provisional Application No. 61/746,570, filed on Dec. 28, 2012 and entitled "Methods of CSI measurement and report for coverage enhancement", the contents of which are incorporated herein in their entirety.

BACKGROUND OF THE INVENTION

1. Field of the Invention

The present invention relates to a method used in a wireless communication system and related communication device, and more particularly, to a method of handling a cell selection and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In certain situations, the UE needs to perform a cell selection to select a cell before performing communications via the cell. The situations may be that the UE is just turned on, the UE is not used for a long time, or the UE is new without any registration history. However, the requirement for completing the cell selection is strict, e.g., the cell selection needs to be completed within hundreds of milliseconds (e.g., 600 ms). The UE may not meet the requirement when the UE is not in a good environment or when capability of the UE is not good enough, e.g., the UE is a low cost device (e.g., machine type communication (MTC) device). Accordingly, the UE may need to perform the cell selection for a great number of times. As a result, the UE may need to spend a long time completing the cell selection, resources (e.g., power) for performing the cell (re)selection may be wasted, and the UE may not able to find a suitable cell for camping.

Thus, the cell selection with corresponding requirement (i.e., legacy mode or normal mode) defined in the 3GPP standard may not be flexible and suitable for diverse environments and communication devices.

Thus, how to perform the cell selection efficiently and flexibly is an important problem to be solved.

SUMMARY OF THE INVENTION

The present invention therefore provides a method and related communication device for handling a cell selection to solve the abovementioned problem.

A method of handling a cell selection for a communication device comprises performing the cell selection in a first one of a normal mode and a coverage enhancement mode, to select a cell; and camping on the cell in a second one of the normal mode and the coverage enhancement mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
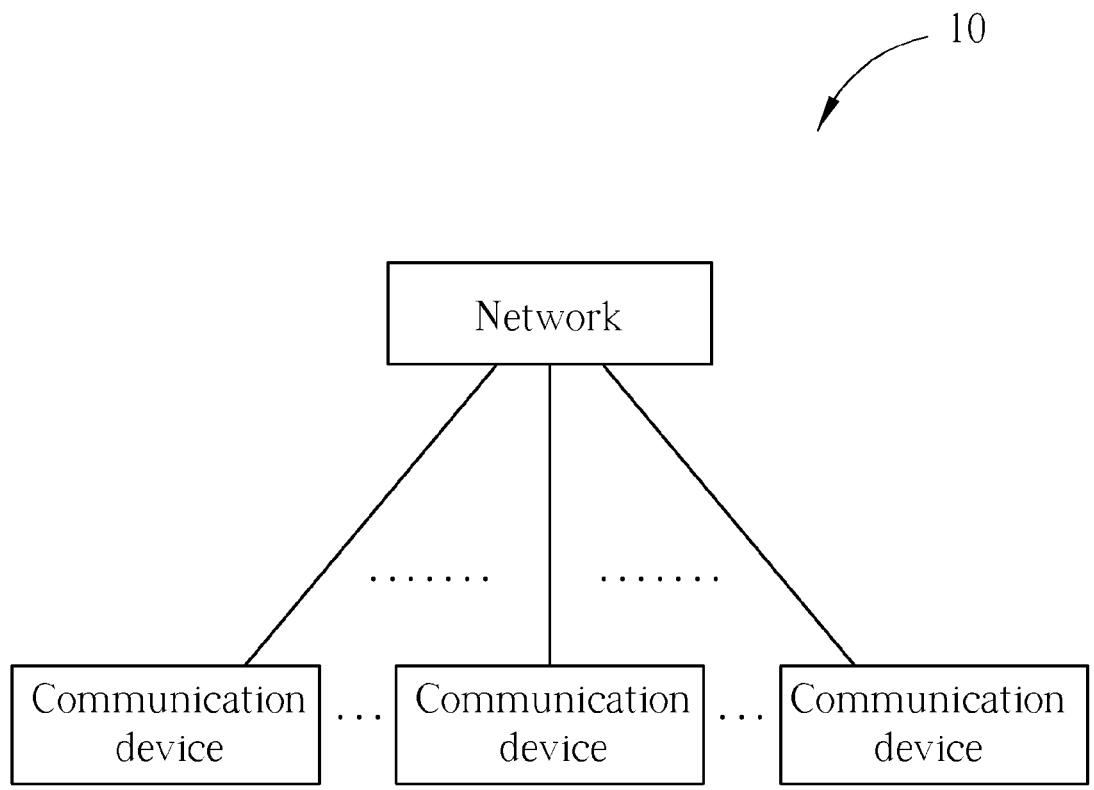
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a user equipment (UE), a low cost device (e.g., machine type communication (MTC) device), a mobile phone, a laptop, a tablet computer, an electronic book or a portable computer system. Besides, the network and the communication device can be seen as a transmitter or a receiver according to direction, e.g., for an uplink (UL), the communication device is the transmitter and the network is the receiver, and for a downlink (DL), the network is the transmitter and the communication device is the receiver.

Figure 2:
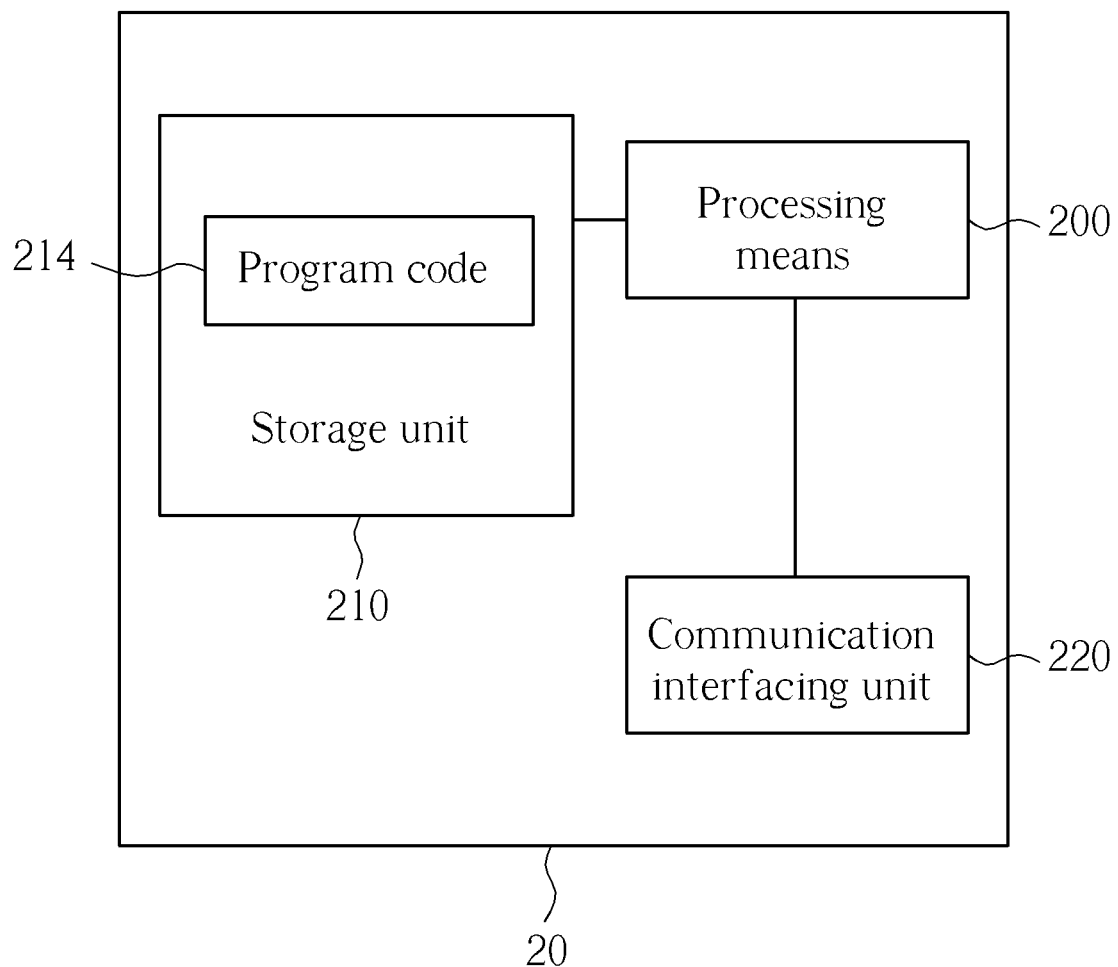
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
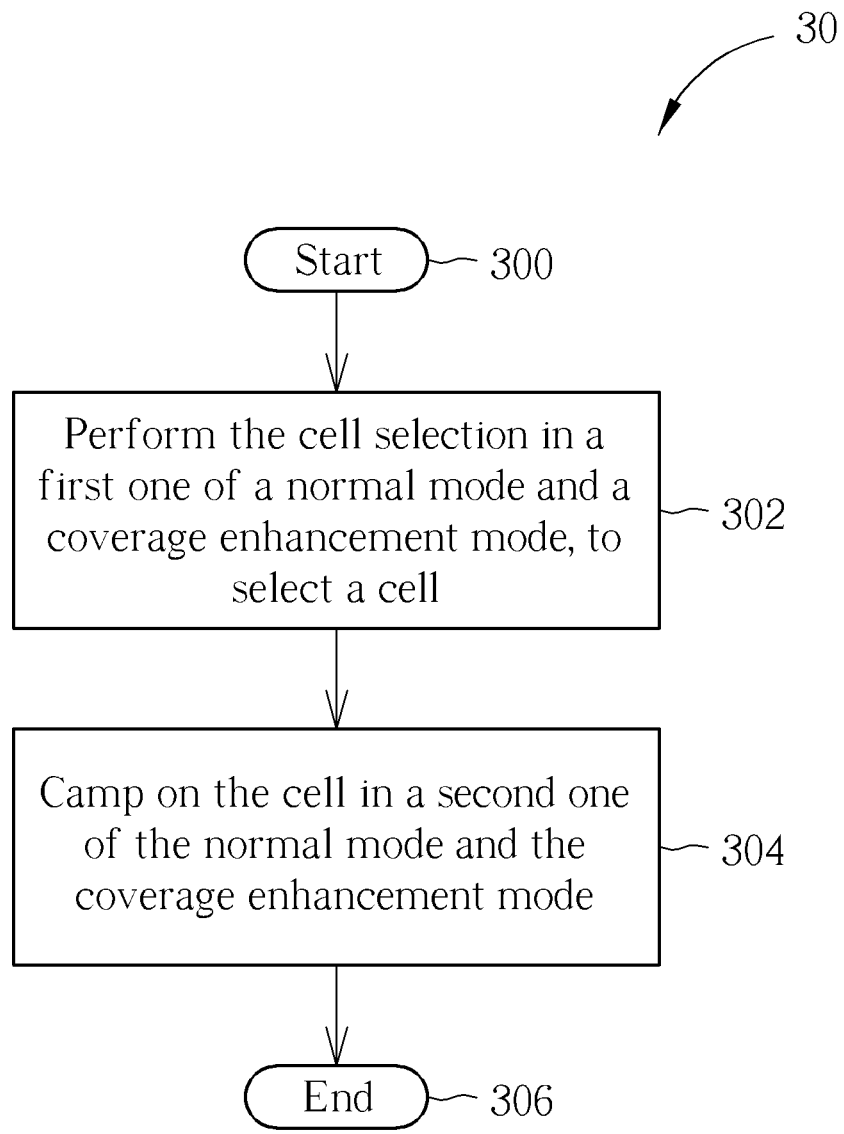
FIG. 3 is a flowchart of a process according to an example of the present invention.

Please refer to FIG. 3, which is a flowchart of a process 30 according to an example of the present invention. The process 30 can be utilized in a communication device shown in FIG. 1, for handling a cell selection. The process 30 may be compiled into the program code 214 and includes the following steps:

Step 300: Start.

Step 302: Perform the cell selection in a first one of a normal mode and a coverage enhancement mode, to select a cell.

Step 304: Camp on the cell in a second one of the normal mode and the coverage enhancement mode.

Step 306: End.

According to the process 30, the communication device performs the cell selection in a first one of a normal mode and a coverage enhancement mode, to select a cell (e.g., a carrier frequency). Then, the communication device camps on the cell in a second one of the normal mode and the coverage enhancement mode. That is, the communication device can choose one of the modes for performing the cell selection, and can choose another one of the modes for camping on the cell. In other words, one or more modes can be used by the communication device according to the environment where it is and/or its capability. Note that the term "cell selection" can be referred to the cell selection and/or the cell reselection, and is not limited. Thus, the communication device does not need to perform the cell selection for a great number of times in the normal mode and does not need to waste resources (e.g., power) for performing the cell (re)selection in the normal mode. In addition, the problem that the UE may not be able to find a suitable cell is solved, and the UE may find the suitable cell within a shorter time.

Realization of the present invention is not limited to the above description.

In one example, the normal mode may be a legacy mode defined in the 3rd Generation Partnership Project (3GPP) standard, and the coverage enhancement mode corresponds to at least one relaxed parameter, a relaxed criterion (e.g., relaxed cell selection criterion S including parameters 'Srxlev' and 'Squel') and/or at least one dedicated resource. That is, the coverage enhancement mode can be seen as a mode in which the communication device can complete the cell selection (e.g., find a suitable cell) easier and/or faster under a relaxed requirement (e.g., using a relaxed configuration). Note that the at least one relaxed parameter, the relaxed criterion and/or the least one dedicated resource may be obtained by modifying at least one parameter, a criterion and/or at least one resource defined in the 3GPP standard, respectively. In another example, the at least one relaxed parameter, the relaxed criterion and/or the least one dedicated resource may be newly added (e.g., defined) in the 3GPP standard (e.g., of a new version).

Note that the at least one relaxed parameter can be any set of parameter making the communication device to complete the cell selection easily. For example, the at least one relaxed parameter can be at least one relaxed timing requirement such that the communication device has more time to decode system information, wherein the system information may include a primary synchronization signal (PSS), a secondary synchronization signal (SSS), a physical broadcast channel (PBCH) and/or a system information block type 1 (SIB1), and is not limited herein. For example, an original timing requirement in the normal mode for decoding the PSS may be 10 ms, and the relaxed timing requirement in the coverage enhancement mode for decoding PSS can be 100 ms. In another example, a combination value (e.g., number of combinations) for the PSS, the SSS, the PBCH and/or the SIB1 may be increased in the coverage enhancement mode.

Note that the at least one dedicated resource may include one or more physical random access channel (PRACH) resources. For example, additional and repeated PRACH resources may be used by the communication device in the coverage enhancement mode such that the communication device can use the PRACH resources by using combining techniques to complete the cell selection. In addition, a dedicated resource (i.e., one or each of the at least one dedicated resource mentioned above) may be identified (e.g., indicated) by a carrier frequency of the dedicated resource, a bandwidth of the dedicated resource, a cell-ID of the dedicated resource and/or a location of the dedicated resource, and is not limited.

In addition, the communication device may determine the first one of the normal mode and the coverage enhancement mode in the process 30 according to a cell-selection criterion before performing the cell selection. That is, the communication device may select one of the normal mode and the coverage enhancement mode for performing the cell selection according to the cell-selection criterion. For example, the cell-selection criterion may include a comparison of a received signal quality (e.g., received signal power, time-domain received signal power) of the communication device with a threshold. Preferably, the communication device may select the normal mode if the received signal quality (e.g., power) is greater than the threshold, and may select the coverage enhancement mode if the received signal quality (e.g., power) is not greater than the threshold.

In addition, the first one of the normal mode and the coverage enhancement mode in the process 30 may be predetermined for performing the cell selection. That is, the communication device does not need to select a mode from the normal mode and the coverage enhancement mode, but uses the predetermined mode directly, wherein the predetermined mode may be the normal mode or the coverage enhancement mode. In another example, the first one of the normal mode and the coverage enhancement mode and the second one of the normal mode and the coverage enhancement mode can be the same mode. That is, the same mode can be used for both the cell selection and camping on the cell. In another example, the communication device may perform the cell selection in the coverage enhancement mode, if the first one of the normal mode and the coverage enhancement mode in the process 30 is the normal mode and a number of failed cell selections is greater than a first threshold and/or a time spent on the cell selection is greater than a second threshold. That is, the communication device may try to perform the cell selection in the coverage enhancement mode, if the communication device has performed the cell selection in the normal mode (e.g., the normal mode is predetermined or selected) and one or two of the following criterions is met. The communication device fails to complete the cell selection for a number of times greater than the first threshold and/or the time spent on the cell selection is greater than the second threshold.

A method according to which the second one of the normal mode and the coverage enhancement mode in the process 30 is determined is not limited. For example, the communication device may determine the second one of the normal mode and the coverage enhancement mode according to a camp criterion (e.g., S criterion) before camping on the cell. That is, the communication device may select one of the normal mode and the coverage enhancement mode for camping on the cell according to the camp criterion. For example, the camp criterion may include a comparison of a signal quality of the communication device (e.g., reference signal received power (RSRP) and/or reference signal received quality (RSRQ)) with at least one threshold. Preferably, the communication device may select the normal mode if the signal quality is greater than the at least one threshold and the cell selection is performed in the coverage enhancement mode. The above situation may happen, if the communication device conservatively (or erroneously) selects the coverage enhancement mode for performing the cell selection and the signal quality is better enough for camping on the cell in the normal mode.

Figure 4:
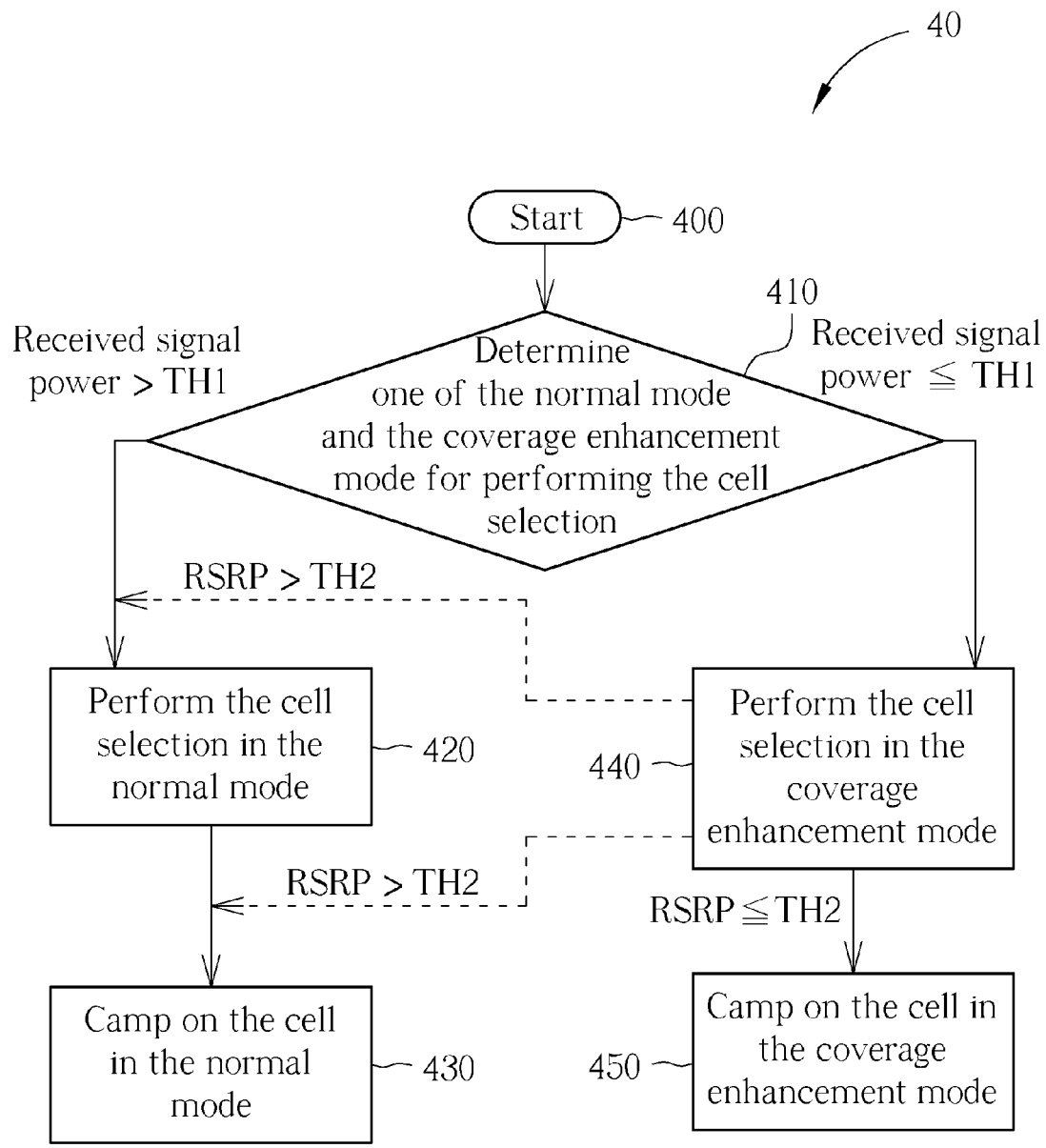
FIG. 4 is a flowchart of a process according to an example of the present invention.

Please refer to FIG. 4, which is a flowchart of a process 40 according to an example of the present invention. The process 40 can be utilized in a communication device shown in FIG. 1, for handling a cell selection. As shown in FIG. 4, the communication device determines one of the normal mode and the coverage enhancement mode for performing the cell selection (step 410), after the communication device starts to perform the cell selection (step 400). If a received signal quality of the communication device is greater than a threshold TH1, the communication device performs the cell selection in the normal mode to select a cell (step 420) and camps on the cell in the normal mode (440). If the received signal quality is not greater than the threshold TH1, the communication device performs the cell selection in the coverage enhancement mode to select a cell (step 440) and camps on the cell in the coverage enhancement mode (450). However, it may happen that the communication device may recognize that a RSRP of the communication device is greater than a threshold TH2 when performing the cell selection in the coverage enhancement mode. In this situation, the communication device may camp on the cell in the normal mode (step 430), after performing the cell selection in the coverage enhancement mode. In another example, the communication device may perform the cell selection again in the normal mode (step 420), after performing the cell selection in the coverage enhancement mode.

Figure 5:
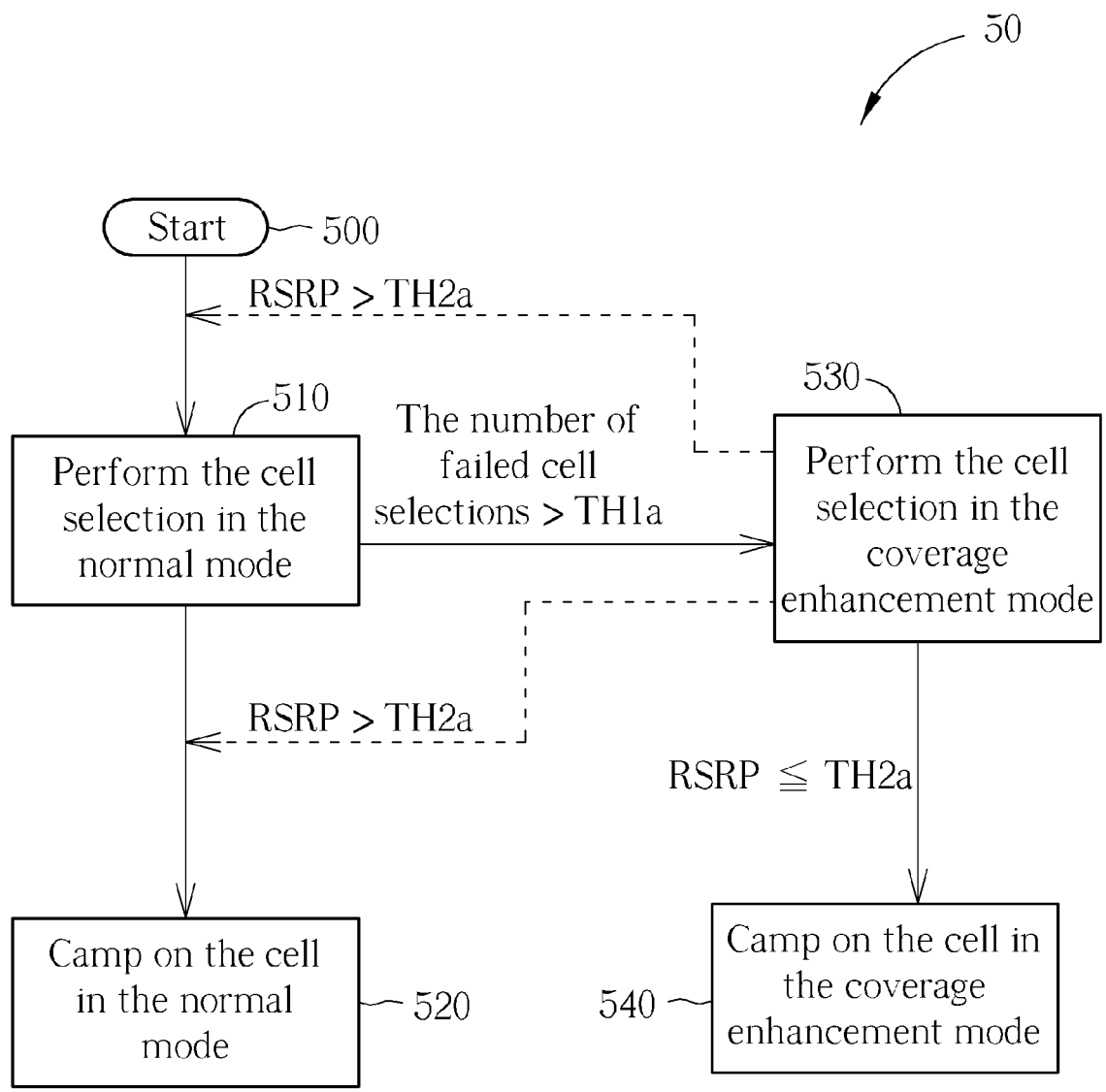
FIG. 5 is a flowchart of a process according to an example of the present invention.

Please refer to FIG. 5, which is a flowchart of a process 50 according to an example of the present invention. The process 50 can be utilized in a communication device shown in FIG. 1, for handling a cell selection. As shown in FIG. 5, the communication device performs the cell selection in the normal mode to select a cell (step 510), after the communication device starts to perform the cell selection (step 500). Then, the communication device camps on the cell in the normal mode (520). That is, the normal mode is predetermined (or configured by the network) for the cell selection. However, it may happen that the communication device fails to complete the cell selection in the normal mode and a number of failed cell selections is greater than a threshold TH1a (and/or a time spent on the cell selection is greater than another threshold). Then, the communication device tries to perform the cell selection in the coverage enhancement mode to select a cell (step 530) and camps on the cell in the coverage enhancement mode (540). Similarly, it may happen that the communication device may recognize that a RSRP of the communication device is greater than a threshold TH2a when performing the cell selection in the coverage enhancement mode. In this situation, the communication device may camp on the cell in the normal mode (step 520), after performing the cell selection in the coverage enhancement mode. In another example, the communication device may perform the cell selection again in the normal mode (step 510), after performing the cell selection in the coverage enhancement mode.

Figure 6:
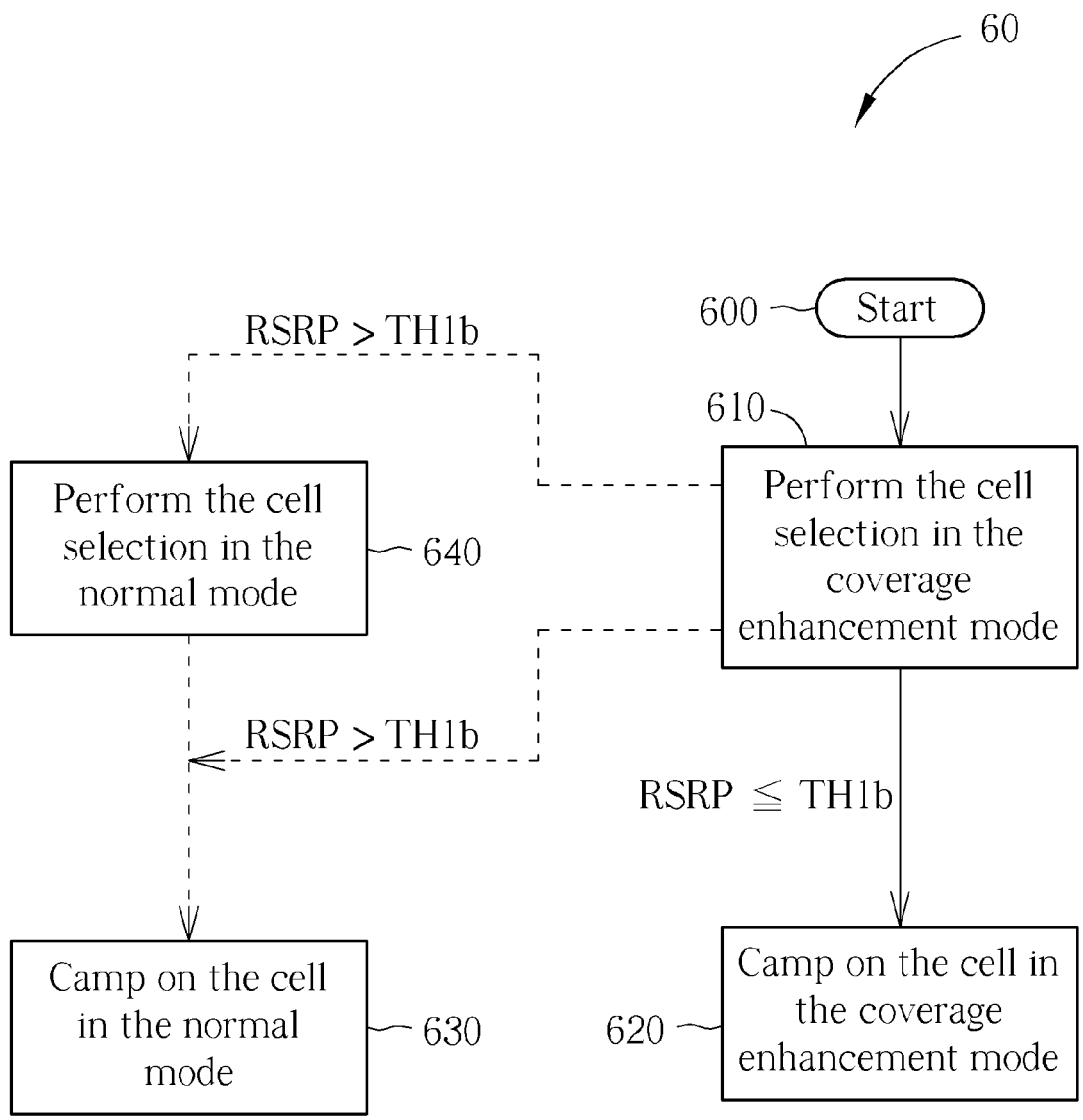
FIG. 6 is a flowchart of a process according to an example of the present invention.

Please refer to FIG. 6, which is a flowchart of a process 60 according to an example of the present invention. The process 60 can be utilized in a communication device shown in FIG. 1, for handling a cell selection. As shown in FIG. 6, the communication device performs the cell selection in the coverage enhancement mode to select a cell (step 610), after the communication device starts to perform the cell selection (step 600). Then, the communication device camps on the cell in the coverage enhancement mode (620). That is, the coverage enhancement mode is predetermined (or configured by the network) for the cell selection. For example, the process 60 may be performed, when the coverage enhancement mode is a predetermined mode in the communication device. In another example, the process 60 may be performed, when the coverage enhancement is the only mode supported by the communication device. Similarly, it may happen that the communication device may recognize that a RSRP of the communication device is greater than a threshold TH1b when performing the cell selection in the coverage enhancement mode. In this situation, the communication device may camp on the cell in the normal mode (step 630), after performing the cell selection in the coverage enhancement mode. In another example, the communication device may perform the cell selection again in the normal mode (step 640), after performing the cell selection in the coverage enhancement mode Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling a cell selection for a communication device. Thus, the communication device does not need to perform the cell selection for a great number of times in the normal mode and does not need to waste resources for performing the cell (re)selection in the normal mode. In addition, the problem that the UE may not be able to find a suitable cell is solved, and the UE may find the suitable cell within a shorter time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a cell selection for a communication device, the method comprising:
   performing the cell selection in a first one of a normal mode and a coverage enhancement mode, to select a cell; and
   camping on the cell in a second one of the normal mode and the coverage enhancement mode;
   wherein at least one first parameter, one first criterion and/or at least one dedicated resource of the coverage enhancement mode for performing the cell selection are different from at least one second parameter, one second criterion and/or at least one resource of the normal mode for performing the cell selection;
   wherein the communication device performs the cell selection in the coverage enhancement mode, if the first mode is the normal mode and the communication device fails to complete the cell selection.

2. The method of claim 1, wherein the normal mode is a legacy mode defined in the 3rd Generation Partnership Project (3GPP) standard.

3. The method of claim 1, wherein the at least one dedicated resource is identified by a carrier frequency of the at least one dedicated resource, a bandwidth of the at least one dedicated resource, a cell-ID of the at least one dedicated resource and/or a location of the at least one dedicated resource.

4. The method of claim 1, further comprising the step of:
   determining the first one of the normal mode and the coverage enhancement mode according to a cell-selection criterion before performing the cell selection.

5. The method of claim 4, wherein the cell-selection criterion comprises a comparison of a received signal quality of the communication device with a threshold.

6. The method of claim 5, wherein the communication device determines that the first one of the normal mode and the coverage enhancement mode is the normal mode if the received signal quality is greater than the threshold, and determines that the first one of the normal mode and the coverage enhancement mode is the coverage enhancement mode if the received signal quality is not greater than the threshold.

7. The method of claim 1, wherein the first one of the normal mode and the coverage enhancement mode is predetermined for performing the cell selection.

8. The method of claim 1, wherein the first one of the normal mode and the coverage enhancement mode and the second one of the normal mode and the coverage enhancement mode are the same mode.

9. The method of claim 1, wherein the first one of the normal mode and the coverage enhancement mode and the second one of the normal mode and the coverage enhancement mode are the coverage enhancement mode.

10. The method of claim 1, wherein the communication device performs the cell selection in the coverage enhancement mode, if the first one of the normal mode and the coverage enhancement mode is the normal mode and a number of failed cell selections is greater than a first threshold and/or a time spent on the cell selection is greater than a second threshold.

11. The method of claim 1, further comprising the step of:
    determining the second one of the normal mode and the coverage enhancement mode according to a camp criterion before camping on the cell.

12. The method of claim 11, wherein the camp criterion comprises a comparison of a signal quality of the communication device with at least one threshold.

13. The method of claim 12, wherein the communication device determines that the second one of the normal mode and the coverage enhancement mode is the normal mode, if the signal quality is greater than the threshold and the first one of the normal mode and the coverage enhancement mode is the coverage enhancement mode.

14. The method of claim 1, wherein the at least one first parameter, the first criterion and/or the at least one dedicated resource correspond to a selection criterion S of the coverage enhancement mode, and the at least one second parameter, the second criterion and/or the at least one resource correspond to a selection criterion S of the normal mode.

15. The method of claim 7, wherein the first mode is the normal mode.

16. A communication device for handling a cell selection, comprising:
    a storage unit, for storing instructions of:
       performing the cell selection in a first one of a normal mode and a coverage enhancement mode, to select a cell; and
       camping on the cell in a second one of the normal mode and the coverage enhancement mode;
       wherein at least one first parameter, one first criterion and/or at least one dedicated resource of the coverage enhancement mode for performing the cell selection are different from at least one second parameter, one second criterion and/or at least one resource of the normal mode for performing the cell selection;
       wherein the communication device performs the cell selection in the coverage enhancement mode, if the first mode is the normal mode and the communication device fails to complete the cell selection; and
    a processing means, coupled to the storage unit, configured to execute the instructions stored in the storage unit.

17. The communication device of claim 16, wherein the normal mode is a legacy mode defined in the 3rd Generation Partnership Project (3GPP) standard.

18. The communication device of claim 16, wherein the at least one dedicated resource is identified by a carrier frequency of the at least one dedicated resource, a bandwidth of the at least one dedicated resource, a cell-ID of the at least one dedicated resource and/or a location of the at least one dedicated resource.

19. The communication device of claim 16, further comprising the instruction of:
    determining the first one of the normal mode and the coverage enhancement mode according to a cell-selection criterion before performing the cell selection.

20. The communication device of claim 19, wherein the cell-selection criterion comprises a comparison of a received signal quality of the communication device with a threshold.

21. The communication device of claim 20, wherein the communication device determines that the first one of the normal mode and the coverage enhancement mode is the normal mode if the received signal quality is greater than the threshold, and determines that the first one of the normal mode and the coverage enhancement mode is the coverage enhancement mode if the received signal quality is not greater than the threshold.

22. The communication device of claim 16, wherein the first one of the normal mode and the coverage enhancement mode is predetermined for performing the cell selection.

23. The communication device of claim 16, wherein the first one of the normal mode and the coverage enhancement mode and the second one of the normal mode and the coverage enhancement mode are the same mode.

24. The communication device of claim 16, wherein the first one of the normal mode and the coverage enhancement mode and the second one of the normal mode and the coverage enhancement mode are the coverage enhancement mode.

25. The communication device of claim 16, wherein the communication device performs the cell selection in the coverage enhancement mode, if the first one of the normal mode and the coverage enhancement mode is the normal mode and a number of failed cell selections is greater than a first threshold and/or a time spent on the cell selection is greater than a second threshold.

26. The communication device of claim 16, further comprising the instruction of:
  determining the second one of the normal mode and the coverage enhancement mode according to a camp criterion before camping on the cell.

27. The communication device of claim 26, wherein the camp criterion comprises a comparison of a signal quality of the communication device with at least one threshold.

28. The communication device of claim 27, wherein the communication device determines that the second one of the normal mode and the coverage enhancement mode is the normal mode, if the signal quality is greater than the threshold and the first one of the normal mode and the coverage enhancement mode is the coverage enhancement mode.

29. The communication device of claim 16, wherein the at least one first parameter, the first criterion and/or the at least one dedicated resource correspond to a selection criterion S of the coverage enhancement mode, and the at least one second parameter, the second criterion and/or the at least one resource correspond to a selection criterion S of the normal mode.

30. The communication device of claim 22, wherein the first mode is the normal mode.

* * * * *